(No Model.) 2 Sheets—Sheet 2.
C. BLIVEN.
Saw Mill Log Carriage.
No. 229,084. Patented June 22, 1880.
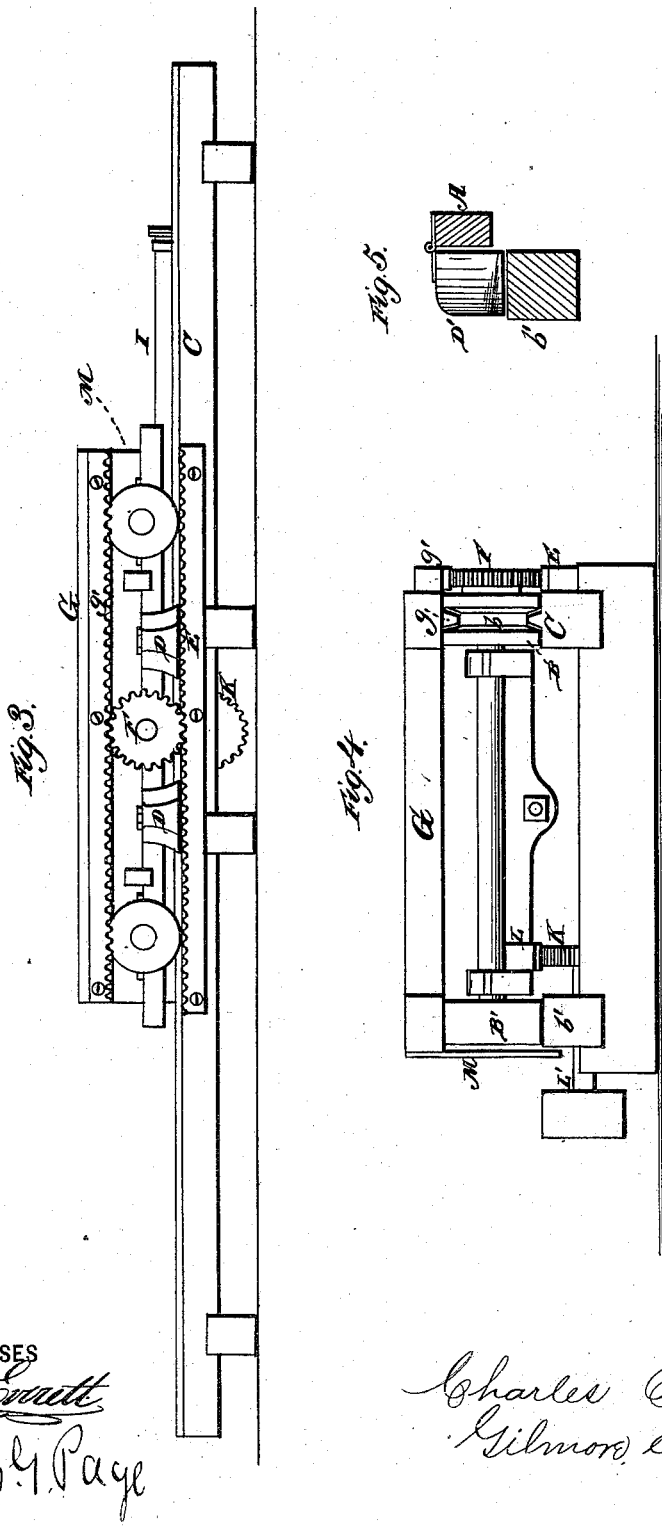

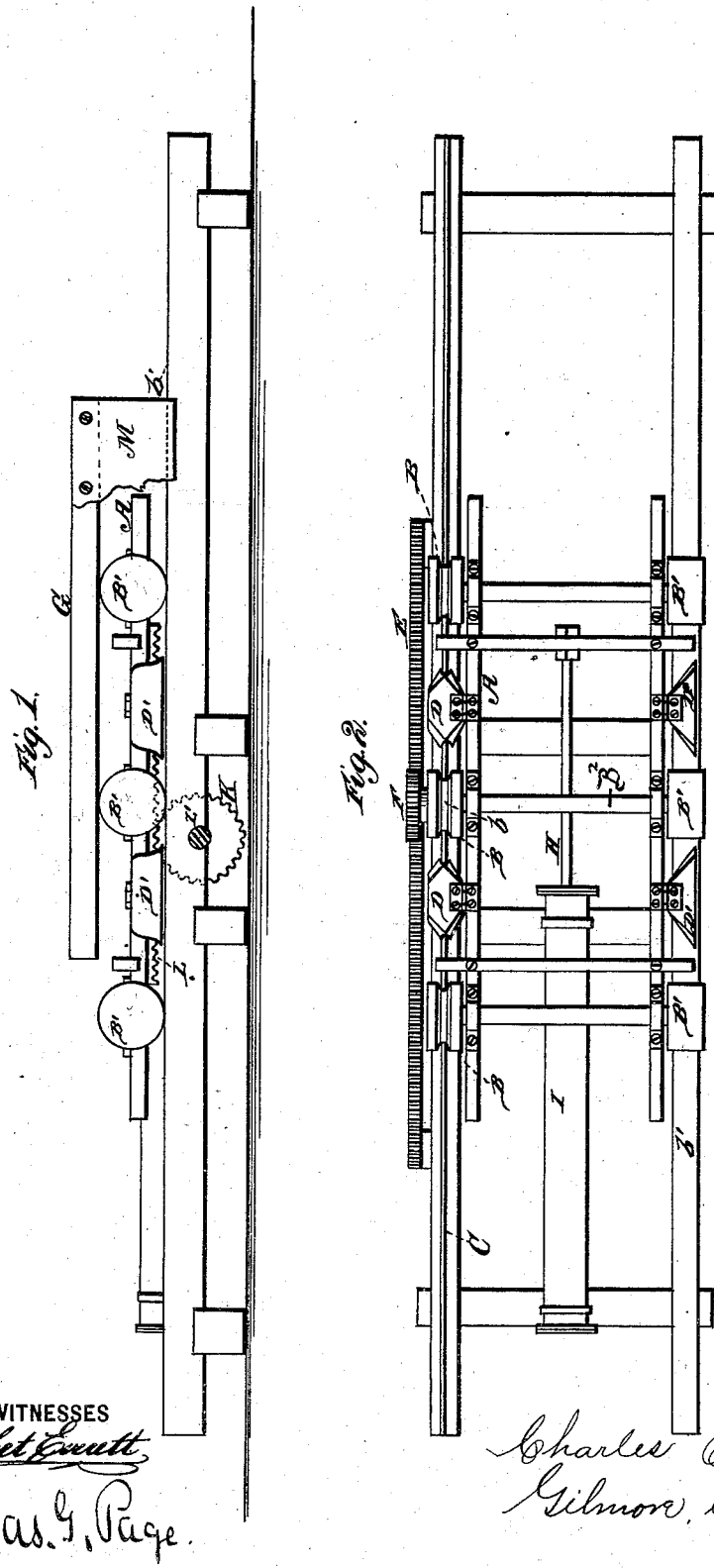

UNITED STATES PATENT OFFICE.

CHARLES BLIVEN, OF NORFOLK, VIRGINIA.

SAW-MILL LOG-CARRIAGE.

SPECIFICATION forming part of Letters Patent No. 229,084, dated June 22, 1880.

Application filed April 10, 1880. (No model.)

*To all whom it may concern:*

Be it known that I, CHARLES BLIVEN, of Norfolk, in the county of Norfolk and State of Virginia, have invented certain new and useful Improvements in Saw-Mill Log-Carriages; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side elevation of my saw-mill carriage. Fig. 2 is a plan view of the same with the upper frame removed. Fig. 3 is also a side elevation view. Fig. 4 is an end view, and Fig. 5 a detail.

The nature of my invention relates to log-carriages for saw-mills.

In some instances the carriage has been fed forward and retracted by the piston of a steam-cylinder connecting with the carriage. In such cases the length of the piston and cylinder must be very great, since the length of the piston must be equal to the distance traversed by the carriage. Under my improvement, however, the length of stroke need be but one-half of the distance which the log is required to move, since a platform is employed which, during the feed of the carriage, will travel double the distance which the carriage traverses. I also propose feeding the platform by means of a cog-wheel and rack-bar, thus insuring a positive feed and preventing any slipping.

Under my improvement other features of novelty are involved, as will be fully described in the following specification, and particularly pointed out in the claims.

Referring by letter to the drawings, A designates the carriage, which is mainly composed of side and cross bars connected together so as to constitute a structure possessing the required strength. The rollers upon which this carriage is supported are of two classes. The class designated by B are formed with grooves *b* and run upon a track, C, on the off side of the saw, while the class marked B' are plane-faced rollers and run upon a bar, *b'*, which is nearest to the saw. The track affords all the guide which is necessary for the carriage, while the bar, having a plane surface, will not become clogged with sawdust so readily as if a track were employed, and being nearest to the saw will catch more sawdust than the track on the off side of the saw, which sawdust may be more readily cleared off from the same.

The rollers are rigidly connected by their axles, thus preventing any lateral movement of the carriage.

The track-clearers are all hinged to the side bars of the carriage, those marked D being grooved to receive the rail, and being also wedge-shaped at both ends, while those marked D' have flat under sides, which travel along the bar *b'*. These track-clearers D' have their ends obliqued toward their hinges, and these ends are also slightly curved, so as to facilitate the removal of sawdust from the bar.

Alongside of the track C is a rack-bar, E, upon which travels a cog-wheel, F, this wheel being rigidly connected with one of the grooved rollers. The platform upon which the log rests is composed of a frame, G, provided upon the under side of one of its side bars with a rail, *g*, adapted to fit in the grooves of the grooved rollers, and alongside of this side bar is a rack-bar, *g'*, engaging the cog F. The remaining side bar of the platform rests upon the plane-faced rollers.

Motive power may be applied to the carriage, which is intermediate of the platform and the actuating mechanism, in either of the following ways: The carriage may be fed forward and retracted by the piston-rod H of a steam-cylinder, I, or by means of a cog-wheel, K, which is arranged to engage with a rack-bar, L, secured to the carriage, the cog-wheel in such case being mounted upon a shaft, L', which is driven by any suitable power. In either instance the platform will travel double the distance of the carriage.

In case of the use of the piston and its rod, if, for instance, the piston have a stroke represented by 12, the platform will move over a distance represented by 24—in other words, just twice the stroke of the piston.

In actuating the intermediate carriage by the engagement of a cog-wheel with a rack-bar the movement of the carriage will be positive, there will be no possibility of its jumping, and the work will be performed in a far better manner than if mere slides and anti-friction rollers were employed.

M is a guard-plate secured to the saw or inner side of the platform. This guard serves to protect the bar upon which the smooth-faced wheels travel from flying sawdust.

The operation is as follows: When steam is applied to the piston, and the piston and its rod actuated thereby, the piston-rod will cause the carriage A to move forward on the tracks, which have been heretofore referred to. As the carriage moves forward the rotation of the grooved wheel which is upon the axle $B^2$ (see Fig. 2) causes a like rotation of the gear-wheel F, which is rigidly connected with the said wheel $b$ on shaft $B^2$. This gear-wheel F travels along upon the rack-bar E, and during its rotation it causes the forward movement of the platform G, since, as before explained, the said gear-wheel F engages with the rack-bar $g'$, which is secured to the platform G. The log, which has been previously placed upon the platform G, is thus brought up to the saw. As before stated, when it is not found desirable to use the piston-rod H as the motive power, the power employed may be used to rotate the shaft $L'$, and consequently the gear-wheel K will, in such instance, have a rotary motion. This gear-wheel, which intermeshes with the rack-bar L, which is secured to the carriage A, causes the carriage to move along the tracks, and this movement of the carriage causes the movement of the platform. In conclusion, it may be mentioned that in no instance, so far as can be found, has the piston-rod been connected with the carriage which supports a platform which travels at double the rate of speed at which the carriage moves along the track.

What I claim, and desire to secure by Letters Patent, is—

1. In a saw-mill log-carriage, the combination of a driving-shaft, $L'$, and cog-wheel K thereon with a rack-bar secured to the carriage and engaging with the said cog-wheel and a platform arranged to travel upon the carriage-rollers, substantially as specified.

2. A rack-bar secured alongside of the track at the off side of the saw, in combination with a cog-wheel rigidly connected with one of the carriage-rollers and a platform mounted on the carriage and provided with a rail fitting into grooved rollers of the carriage, substantially as specified.

3. In a saw-mill log-carriage, the herein-described platform provided with a rail, $g$, and a rack-bar, $g'$, in combination with the carriage provided with smooth-faced and grooved rollers and a cog-wheel secured to one of the rollers and arranged to engage with a rack-bar alongside of the track and with the rack-bar of the sliding platform, as set forth.

In testimony that I claim the above I have hereunto subscribed my name in the presence of two witnesses.

CHARLES BLIVEN.

Witnesses:
ROBERT EVERETT,
JAMES J. SHEEHY.